3,787,413
10-CARBAMOYL-PHENOTHIAZINE-3-SULFONAMIDE

Kenji Naka, Negaya, Masayasu Sugiyama, Osaka, and Saiko Nishibori, Takatsuki, Japan, assignors to Ono Pharmaceutical Co., Ltd.
No Drawing. Filed Dec. 13, 1971, Ser. No. 207,533
Claims priority, application Japan, Dec. 26, 1970, 45/128,980
Int. Cl. C07d 93/14
U.S. Cl. 260—243 A       1 Claim

ABSTRACT OF THE DISCLOSURE

This invention relates to a novel compound i.e. 10-carbamoyl-phenothiazine-3-sulfonamide and also to a method for producing the same.

---

The novel compound of this invention has the following chemical formula:

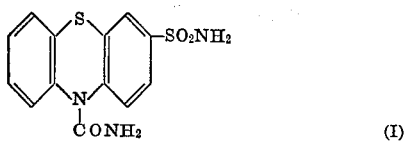

(I)

According to the invention 10-carbamoyl phenothiazine-3-sulfonamide of the Formula I is produced by reacting phenothiazine-3-sulfonamide of the formula:

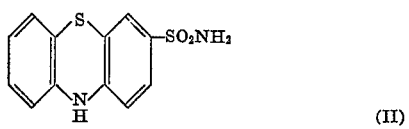

(II)

with phosgene and then treating the resulting N-carbamyl chloride with ammonia. The reaction may be represented by the following formula:

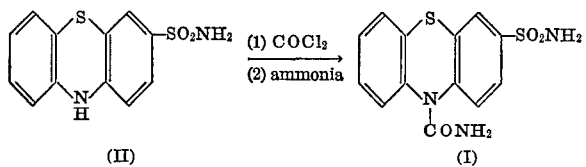

The starting compound i.e. phenothiazine-3-sulfonamide is a novel compound and may be produced (1) by the deacetylation of 10-acetylphenothiazine-3-sulfonamide as represented by the following formula:

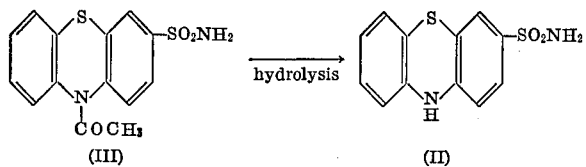

or (2) by the rearrangement of formyl derivative of 2-amino-2′-nitro-4′-sulfamoyldiphenylsulfide of the following Formula IV, followed by the condensation and deformylation, all in alkali, as represented by the following formula:

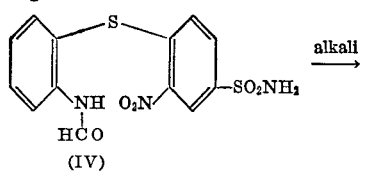

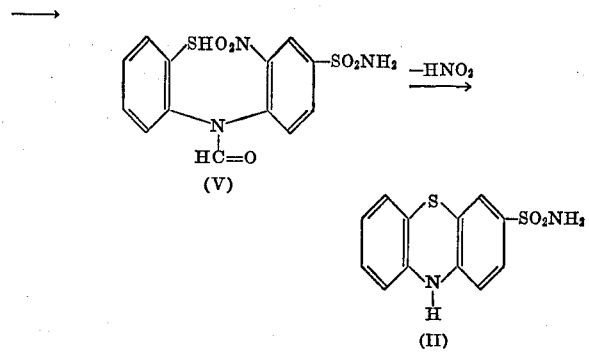

More particularly, the method (1) for the production of the compound of the Formula II may be conducted, for example, as follows: Thus 3.0 g. of 10-acetyl-phenothiazine-3-sulfonamide is added to 43 ml. of 0.5 N aqueous solution of sodium hydroxide and the mixture is boiled for about 3 minutes on a hot water bath and then neutralized with dilute hydrochloric acid. The precipitate is recovered and well washed with water and recrystallized from alcohol to obtain 2.8 g. (yield 100%) of phenothiazine-3-sulfonamide of the Formula II having a melting point of 237–240° C.

The more particular working example of the method (2) is as follows: Thus, 4.3 g. of 2-amino-2′-nitro-4′-sulfamoyldiphenylsulfide is refluxed for 2–3 hours in 43 ml. of 90% formic acid and then cooled. Upon addition of water, there are formed crystals, which are recrystallized from alcohol to obtain 4 g. of the formyl compound of the Formula IV havig a melting point of 205–206° C. Then, 4 g. of the thus obtained compound of the Formula IV is refluxed for 1 hour together with 11.2 ml. of 1 N aqueous solution of potassium hydroxide and 160 ml. of acetone. The formed crystals of potassium nitrite are removed by filtration, and the filtrate is concentrated and added with water to obtain yellow precipitate. The precipitate is recovered, well washed with water and recrystallized from alcohol to obtain 2.8 g. (yield 75.7%) of phenothiazine-3-sulfonamide of the Formula II having a melting point of 239–240° C. The elementary analysis as $C_{12}H_{10}N_2S_2O_2$ is as follows:

Calculated (percent): C, 51.78; H, 3.62; N, 10.06; S, 23.04. Found (percent): C, 51.29; H, 3.53; N, 10.01; S, 23.30.

According to the present invention phenothiazine-3-sulfonamide of the Formula II is first reacted with phosgene to obtain the corresponding N-carbamyl chloride. More particularly an excessive amount, e.g. about 3–4 times the weight of the sulfonamide is absorbed in an aromatic solvent such as benzene, toluene, nitrobenzene, etc. The sulfonamide is added to the solvent before or after the absorption. Then the mixture is heated in an autoclave at 110–120° C. Then the resulting product containing the N-carbamyl chloride is treated with ammonia. This treatment may be conducted by adding the above product to liquid ammonia under cooling or at the room or normal temperature (15–30° C.) or by mixing the above product with an aqueous solution (e.g. 20–40%) of ammonia at 30–50° C. In any case, it is preferable to employ a theoretically excessive amount (e.g. 3–4 times) of ammonia with respect to the starting compound of the Formula II.

The compound of the Formula I of the present invention is a novel compound and shows an inhibitory action on carbonic anhydrase, said action in the brain being especially excellent. Thus, it has a clinical significance as an anti-convulsive.

For example, when the compound of the present invention is injected into the abdominal cavity of rats in an amount of $2.5 \times 10^{-4}$ mol/kg., its inhibitory action on carbonic anhydrase in the brain shows a high value amounting to 80% in contrast to 35% in the case of acetazolamide, and the anti-convulsion effect at this time is so effective that the period of the convulsion caused by the maximum electric stimulus is substantially completely suppressed.

Furthermore, the compound of the present invention has been found to represent an excellent anti-convulsion effect when orally administered. Namely, the period of the convulsion caused by the maximum electric stimulus after five hours of 400 mg./kg. oral administration to mice is substantially completely suppressed.

The present invention is explained by the following example.

EXAMPLE

One hundred ml. nitrobenzene in which 20 g. phosgene had been absorbed and 4.5 g. phenothiazine-3-sulfonamide were placed in an autoclave. In this autoclave the mixture was reacted at 115° C. for seven hours. The resulting reaction liquid was concentrated and added to 300 ml. liquid ammonia. After stirring for one hour under cooling, the reaction liquid was concentrated. The crystals separated out were washed with acetone and recrystallized from methanol containing water. The resulting crystals were 10-carbamoyl-phenothiazine-3-sulfonamide melting at 221–222° C. Yield 4.2 g. (80.8% of the theoretical value of 5.2 g.).

The elementary analysis of this compound for $$C_{13}H_{11}N_3S_2O_3$$

is as follows:

Calculated (percent): C, 48.60; H, 3.42; N, 13.08; S, 19.92. Found (percent): C, 47.90; H, 3.51; N, 13.21; S, 20.10.

What we claim is:

1. 10 - carbamoyl - phenothiazine-3-sulfonamide of the formula:

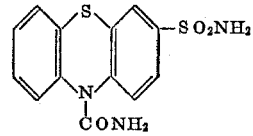

References Cited
UNITED STATES PATENTS 2,776,971    1/1957    Cusic et al. ......... 260—243

HARRY I. MOATZ, Primary Examiner

U.S. Cl. X.R.

424—247; 260—556 AR